Nov. 21, 1961 R. F. LOOMIS 3,009,745
CONVEYING APPARATUS
Filed June 22, 1959 2 Sheets-Sheet 1

INVENTOR.
ROBERT F. LOOMIS

INVENTOR.
ROBERT F. LOOMIS

United States Patent Office 3,009,745
Patented Nov. 21, 1961

3,009,745
CONVEYING APPARATUS
Robert F. Loomis, Allentown, Pa., assignor to Fuller Company, a corporation of Delaware
Filed June 22, 1959, Ser. No. 821,913
8 Claims. (Cl. 302—52)

The present invention relates to the conveying of pulverulent material and particularly to a pressurized vessel in which such material may be stored and from which it subsequently may be discharged into a conveying conduit to be carried therethrough by a gas stream.

In my copending application Serial No. 678,798, filed August 19, 1957, now Patent No. 2,891,817, issued June 23, 1959, of which this application is a continuation-in-part, I have disclosed a pressurized vessel for the storage and subsequent discharge of material into a conveying conduit in which the gas for carrying the material through the conveying conduit is taken from the pressure gas in the upper portion of the vessel. The vessel disclosed in that application is elongated in a horizontal direction and has a gas-permeable deck spaced a slight distance from the bottom of the vessel and inclined downwardly towards a discharge outlet at one end of the vessel which communicates with the conveying line. A baffle extends across the end of the vessel having the discharge outlet to hold back the main body of pulverulent material in the vessel. The baffle has an opening adjacent the gas-permeable deck and stops short of the top of the vessel to provide a passage for pressure gas from the upper part of the vessel into the space between the baffle and the adjacent end of the vessel. In operation, gas is introduced into the plenum chamber formed between the bottom of the vessel and the gas-permeable deck and passes upwardly through the deck and into the overlying material, fluidizing the same. The fluidized material flows downwardly along the upper surface of the inclined deck and through the opening in the baffle towards the discharge outlet and connected conveying conduit. Since the vessel is sealed, the gas which passes from the upper surface of the fluidized material builds up a pressure in the upper portion of the vessel and upon continued introduction of the gas, passes through the space above the baffle and downwardly through the space between the baffle and the end wall of the discharge outlet. This downwardly-flowing stream of gas flows over and entrains the material on the lower end of the deck which has passed through the opening in the baffle and carries it in suspension through the conveying conduit to the desired location.

In many instances it is desired to discharge the material from the bottom of a vessel instead of from one end thereof, and preferably from the center of the vessel, which may be horizontally elongated or vertically disposed.

In my copending application, Serial No. 782,434, filed December 23, 1958, now Patent No. 2,915,337, issued December 1, 1959, of which this application is also a continuation-in-part, I disclosed an improved vessel of the type disclosed in my previous application, Serial No. 678,798. The baffle of the later-filed application includes a deflecting baffle for accelerating the gas flowing downwardly along the passageway of the baffle, which is formed as a U-shaped conduit, and directing the accelerated gas stream against the material passing through the opening in the conduit. This acceleration and direction of the gas stream has been found to be particularly advantageous in bottom discharge vessels of the type disclosed in my copending application, Serial No. 782,435, filed December 23, 1958, now Patent No. 2,915,338, issued December 1, 1959, of which this application is a continuation-in-part.

More particularly, the vessel of the present invention has the gas-permeable deck sloping downwardly in opposite directions towards a centrally-disposed outlet in its bottom, and a gas conduit extends from above the discharge outlet to the upper portion of the vessel. The lower end of the conduit is spaced slightly from the lower end of the inclined deck and from the discharge outlet to provide a space for the flow of material from the deck into the discharge outlet. Thus the conduit functions to limit the amount of material which may flow from the deck to the discharge outlet in a manner similar to the baffle and conduits of my foresaid application. The lower end of the gas conduit preferably has adjustable means to control the amount of the pulverulent material which may flow beneath it to the discharge outlet.

Gas passing upwardly through the gas-permeable deck fluidizes the pulverulent material and causes it to flow along the deck towards the central discharge outlet, and the gas after passing through the body of fluidized pulverulent material builds up a gas pressure in the upper part of the vessel. This pressure gas flows downwardly through the gas conduit extending upwardly from just above the discharge outlet and entrains the material flowing from the discharge portion of the gas-permeable deck and carries it in suspension through the discharge outlet and a conveying conduit connected thereto.

In many cases, it is of distinct advantage to provide gas accelerating means such as a deflecting baffle in the lower region of the conduit. The deflecting baffle preferably is positioned to direct the accelerated gas stream toward the material opening in the conduit.

The invention will be further described in connection with the accompanying drawings, in which several embodiments of the invention are illustrated, and in which.

Figure 1:
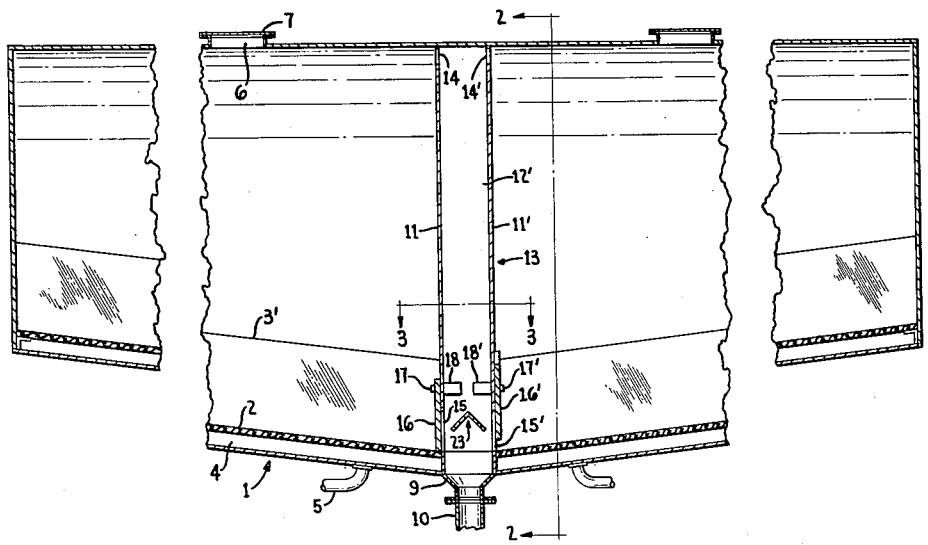
FIG. 1 is a vertical sectional view, with parts broken away, showing one embodiment of the invention.
Figure 3:
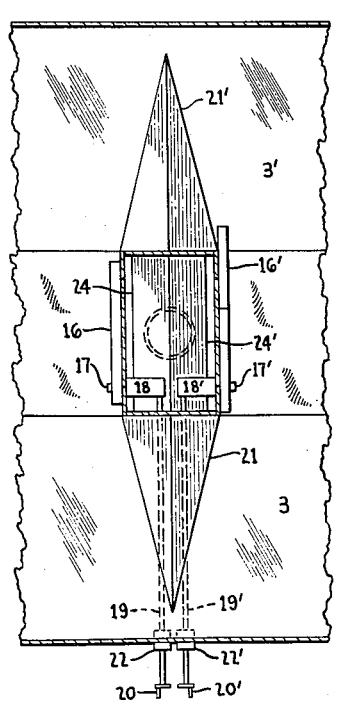
FIG. 3 is an enlarged sectional view on the line 3—3 of FIG. 1.
Figure 4:
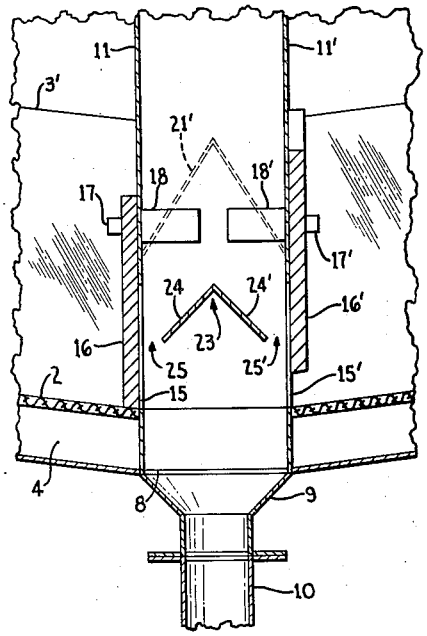
FIG. 4 is an enlarged view of a portion of FIG. 1 showing the deflecting baffle and gates.

Referring now to the drawings, and first to FIGS. 1 to 4, reference character 1 designates a horizontally-elongated vessel for the storage of pulverulent material, such as cement, flour, alumina, chemicals and the like. While the vessel is shown as of cylindrical shape, it may be rectangular or of any other shape. It may be stationary or mobile and form the body of a railway car or of a truck or trailer, or may be mounted on other transporting means such as skids.

A gas-permeable deck 2 extends along the lower portion of the vessel between a pair of slope sheets 3 and 3' and is spaced a slight distance from the bottom to provide a plenum chamber 4 into which gas under pressure may be introduced through a gas inlet pipe 5. The gas-permeable deck may be of any suitable material having the requisite gas permeability, but preferably is made from multi-ply textile material of the nature of heavy canvas belting. The plenum chambers may be formed by separate walls secured against the gas permeable deck, if desired.

The top of the vessel has filling openings 6 and 6' which may be sealed by covers 7 and 7', respectively. The bottom of the vessel has a centrally-disposed outlet 8 about which the outlet or transition member 9 is secured. The lower end of the outlet member is connected to a conveying conduit 10 through which material discharged from the vessel may be conveyed to the desired location.

The gas-permeable deck 2 slopes downwardly from each end of the vessel towards the discharge outlet 8, and its lower edge terminates adjacent the outlet so that pulverulent material fluidized on the deck will flow downwardly along its upper surface and toward the outlet.

Baffle walls 11 and 11' are spaced apart several inches and extend from the sides of the outlet 8 opposite the end walls of the vessel to a position near the top of the vessel. The baffle walls are of substantially the same width as the gas-permeable deck and are positioned transversely thereof.

Where desired, and as discussed hereinafter with reference to FIGS. 5 to 7, either one or both of the baffle walls may take a part of the shape, or substantially the full shape of the cross-section of the material-storage portion of the vessel and may extend either individually or together completely across the vessel to provide two separate compartments therein capable of containing and discharging dissimilar materials without danger of contamination.

A pair of intermediate walls 12 and 12' extend between the edges of the baffle walls and from the sides of the outlet 8 opposite the side walls of the vessel. The intermediate walls preferably extend the full height of the baffle walls to form a spacing support therebetween. The baffle walls 11, 11' and intermediate walls 12, 12' are joined at their adjacent edges and together form a central gas conduit 13 axially and vertically aligned with the discharge outlet. The upper edges of the baffle walls are spaced from the top of the vessel to provide gas passages 14 and 14', respectively, through which pressure gas in each end of the vessel may flow enroute to the discharge outlet 8 via the conduit 13.

The lower edges of the baffle walls are formed with openings or cut-outs 15 and 15' to permit fluidized material above the deck to flow therethrough and to pass to the discharge outlet.

The area of the openings 15, 15' through which the pulverulent material may flow is controlled by gates 16 and 16' mounted against the outside of the baffle walls 11, 11' forming the gas conduit. The gates 16, 16' are each mounted on an individual pivot shaft 17, 17', respectively, extending through the baffles to the interior of the conduit 12 and terminating in right angle drives 18 and 18', respectively. The right angle drives 18, 18' have individual regulating shafts 19, 19' extending externally of the vessel and having handles 20 and 20' respectively. A pair of transversely-extending diverting slope sheets 21 and 21' divert material from the side of the conduit, and diverting slope sheet 21 encloses shafts 19, 19' in the space between the conduit and the slope sheet 3. The regulating shafts 19, 19' pass through the vessel wall via seals such as packed fittings 22, 22', respectively, which preferably include means such as a packing adjusting nut to provide a high frictional contact between the packing and the regulating shaft, thereby aiding in locking the gates in any desired position. Additionally, the gates 16, 16' may be spring-loaded or otherwise biased in tight engagement with the surfaces of their associated baffle walls to provide further frictional contact for locking the gates in a chosen position, as well as aiding in sealing the gate against the baffle walls. Other forms of gates of equivalent function may be substituted, if desired.

Certain materials, depending upon such variables as density, moisture content, and particle-size distribution, have been found to require greater agitation by the gas stream to provide optimum mixing of the material with the gas stream and entrainment therein through the outlet. In these cases, and particularly when the vessel will be required to store and discharge a variety of materials, such as is likely with a vehicle-mounted vessel, gas accelerating means such as a deflecting baffle 23 of inverted V-shape is secured between the intermediate walls 12, 12' and joined thereto at its ends. The deflecting baffle 23 comprises a pair of sloping walls 24 and 24' sloping oppositely and downwardly in planes intersecting the planes of the baffle walls 11 and 11' at the openings 15, 15', respectively. The sloping walls terminate short of the baffle walls to provide restricted gas passages or openings 25, 25', respectively, between the deflecting baffles, baffle walls and intermediate walls. While a rectangular form of restricted opening is preferred, other forms may be employed if desired.

The restricted openings preferably are equal in area, with each being approximately equal in area to one-half the cross-sectional area of the outlet end of the transition member 9 adjacent the conveying line 10.

In operation, gas, usually, air under suitable pressure and in the desired amount will be introduced through the gas-inlet pipe 5 into the plenum chamber 4 to flow through the gas-permeable deck 2 into the overlying pulverulent material. One or both of the gates 16, 16' will be adjusted by means of the appropriate handle 20, shaft 19, drive 18, and shaft 17 to expose the desired area of the openings 15, 15'. The gas fluidizes the pulverulent material and causes it to flow along the upper surface of the deck 2 towards the openings 15, 15' and the discharge outlet. The gas separating from the body of fluidized material accumulates in the upper portion of the vessel and flows through the gas passages 14, 14' and passes, as a flowing stream, downwardly through the gas conduit 13, restricted openings 25, 25' and through the discharge outlet 8, outlet or transition member 9 and into and through a conveying conduit 10. The stream of gas impinging upon the material flowing from the lower ends of the gas-permeable deck 2 entrains the material and carries it in suspension through the outlet 8 and the conduit 10 to the desired location.

In flowing through the conduit 13 toward the discharge outlet, the gas stream is constricted, by the convergence of the sloping walls 24, 24' with the baffle walls 11, 11', respectively, and is directed at increased velocity through the openings 25, 25' toward the openings 15, 15', respectively, and impinges upon and agitates the material passing therethrough into the conduit. The direction of the gas stream as it impinges on the material is slightly in opposition to the flow of material through the openings 15, 15', thereby causing a high degree of turbulence to agitate and disperse the material within the gas stream for entrainment through the discharge outlet 8.

After the vessel has been discharged of all its contents, the gates 16, 16' will be turned to close the openings 15, 15' so that when the vessel is next filled with pulverulent material none of it will flow through the openings until it again is desired to discharge material from the vessel.

While the total area of both restricted openings need not be exactly equal to the cross-sectional area of the conveying line to enable the vessel to operate satisfactorily, this sizing is preferred since it tends to divide the gas stream into two streams approaching or equalling conveying line gas velocities in the region of the two material openings into the conduit. Even when material is discharged from only one opening 15 or 15' at a time, the velocity of the accelerated gas stream adjacent the open gate 16 or 16' will be sufficiently close to conveying-line velocities as to provide the desired agitation and entrainment.

Figure 5:
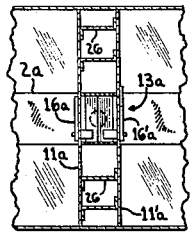
FIG. 5 is a view similar to FIG. 3 showing a modified form of a conduit and baffling walls on a reduced scale.
Figure 6:
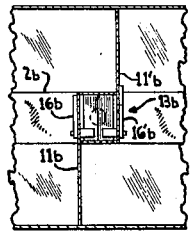
FIG. 6 is a view similar to FIG. 3 showing a further modified form of conduit and baffle structure on a reduced scale.
Figure 7:
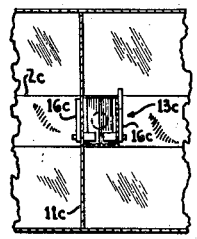
FIG. 7 is a view similar to FIG. 3 showing another modified form of conduit and baffle structure on a reduced scale.

The rectangular form of the restricted openings 25, 25' is particularly advantageous since it discharges a rectangular, accelerated gas stream against the material which then decelerates on impinging against the material and entering the open lower end of the conduit, and is again accelerated in the transition member 9 and reformed into a circular gas stream therein, thereby causing extreme turbulence and effective mixing within the lower end of the conduit and the transition member.

Where separate material compartments within the vessel are desired, modified baffle walls may be employed such as those shown in FIGS. 5, 6, and 7.

As shown in FIG. 5, both baffle walls 11a and 11'a take the shape of the full cross-sectional area of the material storage portion of the vessel, and are secured to the vessel at their edges. The baffle walls are also braced against one another by additional intermediate walls 26. As shown in FIG. 6, each of the baffle walls 11b and 11'b extends to an opposite side of the vessel and on that side takes the shape of and is peripherally secured to the material storage portion of the vessel. In FIG. 7, the baffle wall 11c alone takes the shape of the full cross-sectional area of the material storage portion of the vessel and is secured thereto at its edges.

The operation of the modified forms of the invention shown in FIGS. 5 to 7 is similar to that of the embodiment of FIGS. 1–4.

Figure 8:
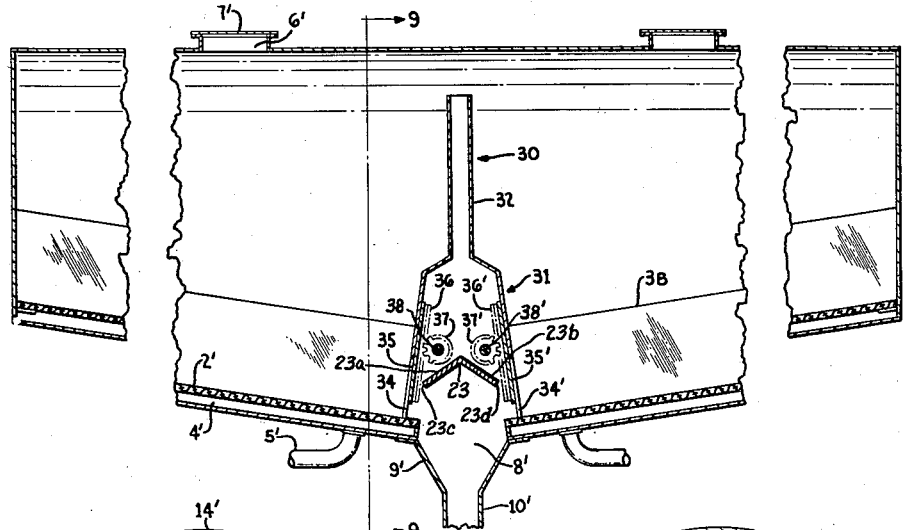
FIG. 8 is a view similar to FIG. 1 showing a different embodiment of the invention.
Figure 9:
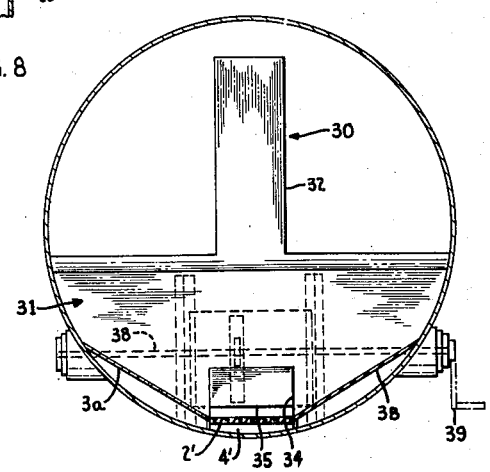
FIG. 9 is a vertical sectional view on line 9—9 of FIG. 8.

The embodiment of the invention disclosed in FIGS. 8 and 9 is quite similar to that disclosed in FIGS. 1 to 4. The vessel 1', gas-permeable deck 2', slope sheets 3a and 3b, plenum chamber 4', gas inlet pipe 5', discharge outlet 8', outlet member 9' and conveyor conduit 10' may be considered as being the same as the corresponding parts of FIGS. 1 and 2.

In this form of the invention, the gas conduit 30, is formed by a box-like housing 31 and a conduit 32 which communicates therewith and extends from the top thereof to a position adjacent the top of the vessel.

The housing extends entirely across the lower portion of the vessel and the side walls 33 and 33' diverge downwardly and their lower ends meet the deck 2' at a position spaced a slight distance from the discharge outlet. If desired, the housing may extend only part of the way across the lower portion of the vessel. The side walls have openings or cut-outs 34 and 34', similar to the openings or cut-outs 15, 15' of the baffle walls 11, 11' of FIGS. 1 and 2 to permit material from the deck 2' to flow through them and to be discharged through the outlet 8'.

Gates 35 and 35' are mounted for vertical reciprocable movement against the inside walls 33, 33' of the housing 31. The gates have rack bars 36 and 36', the teeth of which mesh with the teeth of gears 37 and 37'. The gears are mounted on shafts 38 and 38' which extend through one side wall of the vessel. Handles, such as the handle 39, are mounted on the outer ends of the shafts so that the shafts and gears may be rotated to raise or lower the gates to regulate the area of the openings 34, 34' to control the amount of pulverulent material which may flow through the openings to the discharge outlet. The handles may be held against movement under the forces exerted by the weight of the gates by any suitable means such as by a ratchet and pawl mechanism.

A deflecting baffle 23' having sloping side walls 23a and 23b is located in the box-like housing 31 of the gas conduit 30 and functions to direct the gas stream flowing downwardly through the gas conduit at an increased velocity through openings 23c and 23d toward the openings 34 and 34' to impinge upon and agitate the material passing into and through the conduit. The use of the deflecting baffle 23' is particularly desirable when the material being discharged from the vessel is of such nature as to require a greater degree of gas agitation for mixing preparatory to its entering the conveying line.

Figure 2:
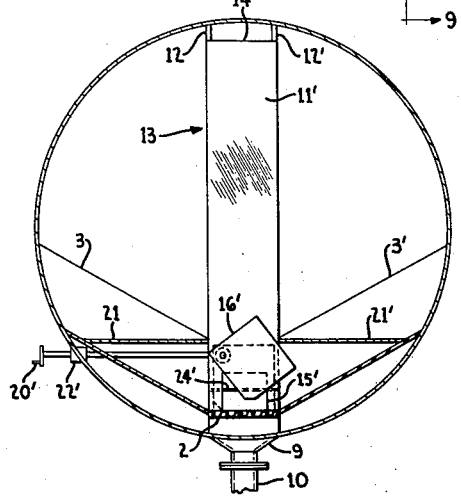
FIG. 2 is a vertical sectional view on the line 2—2 of FIG. 1.

The operation of this embodiment of the invention is substantially the same as that of FIG. 1 and 2, except that the fluidized material, after passing through the openings 34, 34', does not immediately fall through the discharge outlet 8' but continues over the lower ends of the gas-permeable deck towards the outlet. The pressure gas passing from the upper portion of the vessel downwardly through gas conduit 32 into housing 31 sweeps over the toe of the material still remaining on the lower end of the deck 2' and carries it through the discharge outlet 8', discharge member 9', and through the conveyor conduit 10', in suspension. After the vessel has been completely discharged of the pulverulent material therein, the gates may be lowered to close the openings 34, 34' so that when the vessel subsequently is filled none of the pulverulent material will flow through the openings to the discharge outlet.

Various changes may be made in the details of construction of the conveying apparatus disclosed herein without sacrificing any of the advantages thereof or departing from the scope of the invention as set forth in the appended claims.

I claim:

1. Apparatus for discharging pulverulent material comprising a vessel having an inlet for pulverulent material, a gas-permeable deck adjacent the bottom of the vessel and having a discharge portion, a plenum chamber beneath the gas-permeable deck, means for introducing gas under pressure into said plenum chamber to pass upwardly through the gas-permeable deck into overlying pulverulent material to fluidize such material, said vessel having a discharge outlet in its bottom, said discharge outlet being located adjacent the discharge portion of the gas-permeable deck and forming the exit for material and gas from the main portion of said vessel, a gas conduit having its lower end above and in vertical alignment with said discharge outlet, the upper end of the gas conduit being open to the space in the upper portion of the vessel for the flow of gas from the upper portion of the vessel into and downwardly through said conduit, the lower end portion of said gas conduit forming at least in part a passage for the flow of fluidized material from the gas-permeable deck to said discharge outlet, whereby gas flowing from the upper portion of the container downwardly through said gas conduit will entrain material flowing from the gas-permeable deck through said passage and carry it in suspension through the discharge outlet, and means positioned within said gas conduit for accelerating the gas passing downwardly therethrough towards said material passage.

2. Apparatus as set forth in claim 1, in which said gas accelerating means comprises a deflecting baffle positioned to restrict the flow area of the conduit adjacent said passage for the flow of material.

3. Apparatus as set forth in claim 1, in which the gas conduit comprises baffle walls extending entirely across the vessel and upwardly from opposite sides of the discharge outlet, and the baffle walls each have a material opening extending upwardly from adjacent the gas-permeable deck.

4. Apparatus as set forth in claim 3, in which said accelerating means comprises a deflecting baffle within said gas conduit and positioned to restrict the flow area of the conduit adjacent each material opening.

5. Apparatus as set forth in claim 4, in which the deflecting baffle comprises a pair of sloping walls each in a plane converging downwardly with the plane of one of said baffle walls.

6. Apparatus as set forth in claim 1, in which the gas-permeable deck is of less width than the width of the vessel and is positioned intermediate opposite side walls thereof, and which includes slope sheets at each side of the gas-permeable deck extending between said opposite walls and the respective sides of the gas-permeable deck, and additional slope sheets extending from said gas conduit towards said opposite side walls of the vessel and transverse to said first slope sheets.

7. Apparatus as set forth in claim 1, in which the gas conduit includes a housing portion extending across the lower portion of the vessel and over the discharge opening and a conduti portion extending from the top of the housing, at a position over the discharge outlet to a position at the upper poriton of the vessel, in which side walls of the housing each have a material opening extending upwardly from the gas-permeable deck, and which includes a deflecting baffle in the gas conduit positioned to restrict the flow area of the gas conduit adjacent each material opening.

8. Apparatus for discharging pulverulent material comprising a vessel having an inlet for pulverulent material, a gas-permeable deck adjacent the bottom of the vessel and having a discharge portion, a plenum chamber beneath the gas-permeable deck, means for introducing gas under pressure into said plenum chamber to pass upwardly through the gas-permeable deck into overlying pulverulent material to fluidize such material, said vessel having a discharge outlet in its bottom, said discharge outlet being located adjacent the discharge portion of the gas-permeable deck and forming the exit for material and gas from the main portion of said vessel, a gas conduit having its lower end above and in vertical alignment with said discharge outlet, said gas conduit comprising baffle walls extending upwardly from opposite sides of the discharge outlet, the upper end of the gas conduit being open to the space in the upper portion of the vessel for the flow of gas from the upper portion of the vessel into and downwardly through said conduit, the lower end portion of each of said baffle walls forming at least in part a passage for the flow of fluidized material from the gas-permeable deck to said discharge outlet, whereby gas flowing from the upper portion of the container downwardly through said gas conduit will entrain material flowing from the gas-permeable deck through said passages and carry it in suspension through the discharge outlet, and means for accelerating the gas passing downwardly through said gas conduit, said accelerating means comprising baffle means positioned in the lower portion of said conduit and having portions each extending downwardly and towards one of said passages.

References Cited in the file of this patent
UNITED STATES PATENTS

| | | |
|---|---|---|
| 2,915,337 | Loomis | Dec. 1, 1959 |
| 2,915,338 | Loomis | Dec. 1, 1959 |